United States Patent
Keyzer et al.

(10) Patent No.: US 10,048,070 B2
(45) Date of Patent: Aug. 14, 2018

(54) TRANSITIONING FROM STATIONARY ALIGNMENT MODE TO IN-MOTION ALIGNMENT MODE

(71) Applicant: Honeywell International Inc., Morristown, NJ (US)

(72) Inventors: Karl Keyzer, New Brighton, MN (US); Kevin D. Vanderwerf, Oro Valley, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 609 days.

(21) Appl. No.: 14/690,189

(22) Filed: Apr. 17, 2015

(65) Prior Publication Data

US 2016/0305779 A1  Oct. 20, 2016

(51) Int. Cl.
 *G01C 17/38* (2006.01)
 *G01C 21/00* (2006.01)
 (Continued)

(52) U.S. Cl.
 CPC ............. *G01C 17/38* (2013.01); *G01C 21/00* (2013.01); *G01C 21/16* (2013.01); *G01C 25/005* (2013.01)

(58) Field of Classification Search
 CPC ...... G01C 17/38; G01C 21/00; G01C 25/005; G01C 21/16
 See application file for complete search history.

(56) References Cited

U.S. PATENT DOCUMENTS 6,522,266 B1  2/2003  Soehren et al.
7,739,045 B2  6/2010  Thompson, Jr.
(Continued)

FOREIGN PATENT DOCUMENTS

CA  2447809  12/2002
EP  2679954  1/2014

OTHER PUBLICATIONS

European Patent Office, "Extended European Search Report from EP Application No. 16164138.6 dated Sep. 15, 2016", "from Foreign Counterpart of U.S. Appl. No. 14/690,189", Sep. 15, 2016, pp. 1-7, Published in: EP.

(Continued)

*Primary Examiner* — John Breene
*Assistant Examiner* — Mohammad Islam
(74) *Attorney, Agent, or Firm* — Fogg & Powers LLC (57) ABSTRACT

A navigation system to transition from a stationary alignment filter to an in-motion alignment filter is provided. The system comprises a processing unit configured to implement a stationary alignment Kalman filter (SAKF) in gyrocompass alignment mode to generate state estimates and provide corrections when the object is stationary, and to implement an algorithm to compute a covariance for the SAKF that accounts for uncertainty in the SAKF estimates; wherein the processing unit is further configured to implement a continuous alignment filter (CAF) that generates a secondary solution which remains unaffected by the SAKF corrections during a delay period accommodating a delay between the time of actual motion to the time of detected motion, and to implement an algorithm to compute a covariance for CAF that accounts for the uncertainty in CAF during delay period; and wherein outputs of the CAF and its covariance are communicated to an in-motion alignment filter.

20 Claims, 4 Drawing Sheets

(51) Int. Cl.
*G01C 21/16* (2006.01)
*G01C 25/00* (2006.01)

(56) References Cited

U.S. PATENT DOCUMENTS

| | | | |
|---|---|---|---|
| 8,019,543 B2 | 9/2011 | Wang | |
| 8,024,119 B2 | 9/2011 | Zeng et al. | |
| 8,515,672 B1* | 8/2013 | Snyder | G01C 21/00 701/510 |
| 2006/0047427 A1 | 3/2006 | Weed | |
| 2007/0156338 A1* | 7/2007 | Coatantiec | G01C 21/16 701/472 |
| 2008/0077325 A1* | 3/2008 | Bye | G01C 21/165 701/500 |
| 2008/0234933 A1* | 9/2008 | Chowdhary | G01C 21/12 701/479 |
| 2009/0048779 A1* | 2/2009 | Zeng | G01C 21/165 701/511 |
| 2011/0004404 A1 | 1/2011 | Morgan et al. | |
| 2011/0307173 A1* | 12/2011 | Riley | G01C 21/165 701/510 |
| 2013/0035855 A1* | 2/2013 | Natroshvili | G01S 19/49 701/480 |
| 2014/0152493 A1* | 6/2014 | Scherzinger | G01C 21/165 342/357.3 |
| 2015/0204901 A1* | 7/2015 | Faivre | G01S 19/25 702/96 |

OTHER PUBLICATIONS

Pham, "Kalman FilterMechanization for INS Airstart", "retrieved from ftp://161.24.19.221/ele/jacques/CursoNaveg/pham.pdf", Jan. 1992, pp. 3-11, Publisher: IEEE AES Systems Magazine.

Reddy et al., "Advanced Navigation System for Aircraft Applications", "Defense Science Journal", Mar. 2013, pp. 131-137, vol. 63, No. 2, Publisher: DESIDOC.

Wu et al., "Velocity/Position Integration Formula (II): Application to Strapdown Inertial Navigation Computation", "Retrieved from http://arxiv.org/ftp/arxiv/papers/1207/1207.1553.pdf", 2012, pp. 1-18.

* cited by examiner

TRANSITIONING FROM STATIONARY ALIGNMENT MODE TO IN-MOTION ALIGNMENT MODE

BACKGROUND

Alignment of Inertial Navigation Systems (INS) conventionally begins in a gyrocompass alignment, or "stationary alignment" mode to determine pitch, roll, and heading of a vehicle such as an aircraft. Alignment is completed when the system reaches a certain quality. Problems arise when the vehicle moves before alignment is completed in the stationary alignment mode.

Conventionally, once the motion is detected, the pilot is alerted that the alignment has been interrupted. Conventionally, the stationary alignment will restart once motion has ceased. Alternatively, the alignment can be restarted from the beginning in an in-motion alignment mode. Both of the conventional alignment processes consume an extensive amount of time.

SUMMARY

In one embodiment, a navigation system comprises: a processing unit, wherein the processing unit is configured to implement a stationary alignment Kalman filter (SAKF) to generate state estimates and provide corrections when the object is stationary, and wherein the processing unit is further configured to implement an algorithm to compute a covariance for the SAKF that accounts for uncertainty in the SAKF estimates; wherein the processing unit is further configured to implement a continuous alignment filter (CAF) that generates a secondary solution which remains unaffected by the SAKF corrections during a delay period from a time of actual motion to a time of detected motion, and wherein the processing unit is further configured to implement an algorithm to compute a covariance for CAF that accounts for the uncertainty in CAF during delay period; and wherein outputs of the CAF and its covariance are communicated to an in-motion alignment filter.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In conventional navigation systems, alignment begins in a gyrocompass alignment mode. The term "stationary alignment" as used herein also refers to gyrocompass alignment. The terms "stationary alignment mode" and "gyrocompass alignment mode" are used interchangeably herein. Conventionally, when the vehicle has to dispatch after stationary alignment has begun but before it is completed, the stationary alignment is ceased and the system undergoes the entire alignment process again using an in-motion alignment method (provided the system employs an in-motion alignment capability). In conventional systems, the delay from the time motion begins to the time motion is detected by the system results in a corrupted estimate generated using stationary alignment method. The embodiments described herein utilize a continuous alignment filter that allows the system to transition from stationary alignment to in-motion alignment while keeping stationary alignment estimates transferred to in-motion alignment filter uncorrupted. The estimates from stationary alignment are used to complete alignment in-motion thereby reducing the time consumed to complete the alignment while maintaining the accuracy of the system.

In the embodiments described below the stationary alignment Kalman filter (SAKF) generates state estimates until the navigation system detects motion. The SAKF propagates, updates and resets the estimate for current states based on corrections of the states from the current measurement. A continuous alignment filter (CAF) simultaneously provides a secondary solution that remains unaffected by recent SAKF corrections. The CAF removes corrections for a designated period of time. This solution can then be used by the in-motion alignment Kalman filter (AIMKF) to complete the alignment of the vehicle.

Figure 1:
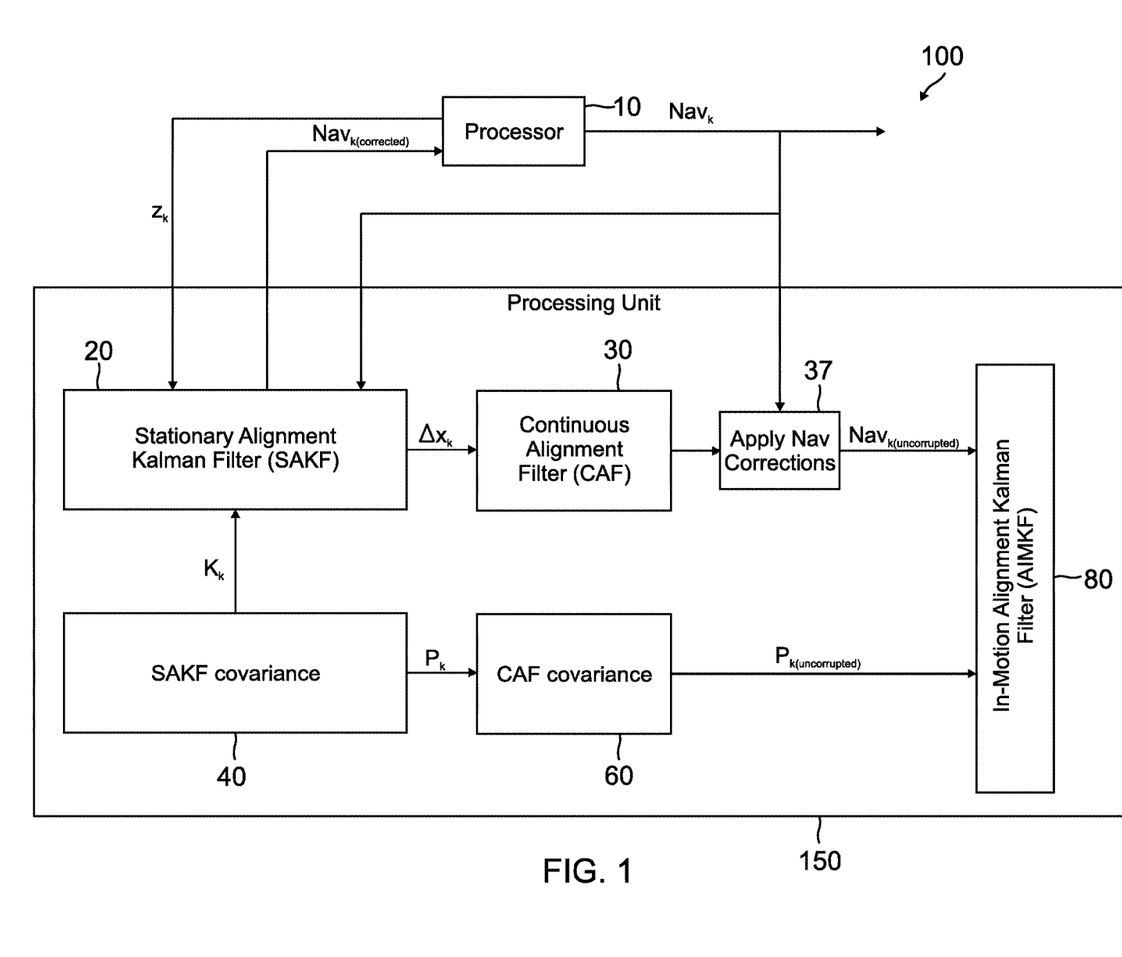
FIG. 1 is one embodiment of an exemplary navigation system implementing a processing unit with an alignment algorithm to transition from stationary alignment mode to in-motion alignment mode.

FIG. 1 is an example of a navigation system 100 including at least one processing unit 150 (which may comprise a core of a multi-core processor) implementing an alignment algorithm to transition from stationary alignment mode to in-motion alignment mode. In the example shown in FIG. 1, processing unit 150 is dedicated to executing software that implements a stationary alignment Kalman filter (SAKF) 20, a SAKF covariance 40 that computes the covariance of SAKF 20, a continuous alignment filter (CAF) 30, a CAF covariance 60 that computes the covariance for CAF 30, and an in-motion alignment Kalman filter (AIMKF) 80. In other implementations, the SAKF 20, CAF 30 and AIMKF 80 can be implemented on separate processing units. Navigation system 100, as shown in FIG. 1, further includes a processor 10 (which may comprise another core of the multi-core processor) that is able to perform inertial sensor and inertial navigation processing. In other implementations, inertial sensor and inertial navigation processing is performed by the processing unit 150.

The system alignment is initialized using a stationary alignment Kalman filter (SAKF) 20. The stationary alignment states include earth's rotation rate error, attitude errors and velocity errors. The predicted measurement for velocity remains zero in the stationary alignment mode. In some implementations, parallel filters are run for different channels of the vehicle (ex. one along x-axis and one along y-axis). SAKF 20 determines state estimates for the pitch, roll and heading.

In some implementations, SAKF 20 is implemented to generate a main solution that is propagated, updated, and reset in real time. The SAKF constantly generates estimates $x_k$ while the vehicle is stationary. $x_k$ represents the vector that includes values for all variables considered by the system during the particular alignment mode. In one implementation, the variables in the stationary alignment mode include one or more of earth's rotation rates, tilt errors, and velocity errors. With each iteration, $x_k$ is predicted, an observation $z_k$ is made and recorded, $x_k$ is updated based on the observation and in some instances, $x_k$ is reset according to the corrections in previous iterations so that the next prediction is more accurate. As shown in FIG. 1, a processor 10 can be used to reset the state to zero and feed the state back into the SAKF to generate a new state estimate based on previous corrections. SAKF covariance 40 computes a covariance matrix of the SAKF $P_k$ that accounts for the uncertainty (errors) in corrections made by the SAKF in each iteration. As time progresses $x_k$ converges on the correct solution, and the diagonal values of covariance matrix $P_k$ get smaller indicating fewer errors. The alignment is complete when the covariance matrix $P_k$ indicates that the values of the covariance matrix are within a predetermined threshold. As shown in FIG. 1, a Kalman gain $K_k$ determined by SAKF covariance 40 is used by the SAKF 20 in updating $x_k$.

When the vehicle takes off before alignment is completed, an in-motion alignment Kalman filter (AIMKF) 80 is implemented to account for variables not considered by the navigation system in the stationary alignment mode. In some implementations, the set of variables considered by the system for corrections in stationary alignment mode is different from the set of variables considered by the system for corrections in the in-motion alignment mode. In one implementation, the AIMKF 80 generates estimates for variables including heading, attitude, velocity and position of the vehicle. The variables updated in the stationary alignment mode are translated into the set of states to be estimated and updated in the in-motion alignment mode. In some implementations, sensor bias states are considered in the stationary alignment mode and the in-motion alignment mode.

Further, the quality of the alignment at the time of motion is communicated to the AIMKF 80. However, a time delay occurs between the time of actual motion of the vehicle and the time that the vehicle's motion is detected by the navigation system. The quality of the alignment communicated to the AIMKF 80 can be corrupted by the corrections that were determined by the SAKF 20 during the time delay. In the example shown in FIG. 1, a continuous alignment filter (CAF) 30 is implemented to account for corrupted updates during the time delay. In some implementations, the covariance of CAF 30 also accounts for the difference in variables included in the estimates computed by the SAKF 20 and variables to be computed by the AIMKF 80.

As shown in FIG. 1, the continuous alignment filter (CAF) 30 is utilized before a state estimate vector is transferred to the AIMKF 80 to account for the corrupted corrections during the time delay. While SAKF 20 generates a main solution, a secondary solution is simultaneously provided by the CAF 30 that remains unaffected by SAKF corrections generated during a desired period of time. This desired period of time (delay period) is determined based on the delay from time of actual motion to time of detected motion. The delay period can be predetermined based on observed time delay in conventional systems between actual motion and detected motion. In some implementations, this delay period is set to 10 seconds. In one implementation, the CAF 30 removes the corrections generated by the SAKF 20 during the delay period, effectively providing an estimate that had been generated before the delay.

The covariance computed for the CAF 30, represented by CAF covariance 60, accounts for the growth in covariance of the system during the delay period. In one implementation, algorithm computing CAF covariance uses the SAKF covariance values prior to the delay and propagates forward to the quality that can be expected after the delay. The propagated covariance value is used by AIMKF 80 for further completion of the alignment.

The estimates generated by the SAKF 20 are used for corrections. In some implementations, when the correction is applied, the state is zeroed but the covariance of the SAKF 20 keeps track of the uncertainty in the total states of the system. In some implementations, the states are zeroed after each iteration and the AIMKF 80 can start the alignment with the states at zero.

Figure 2:
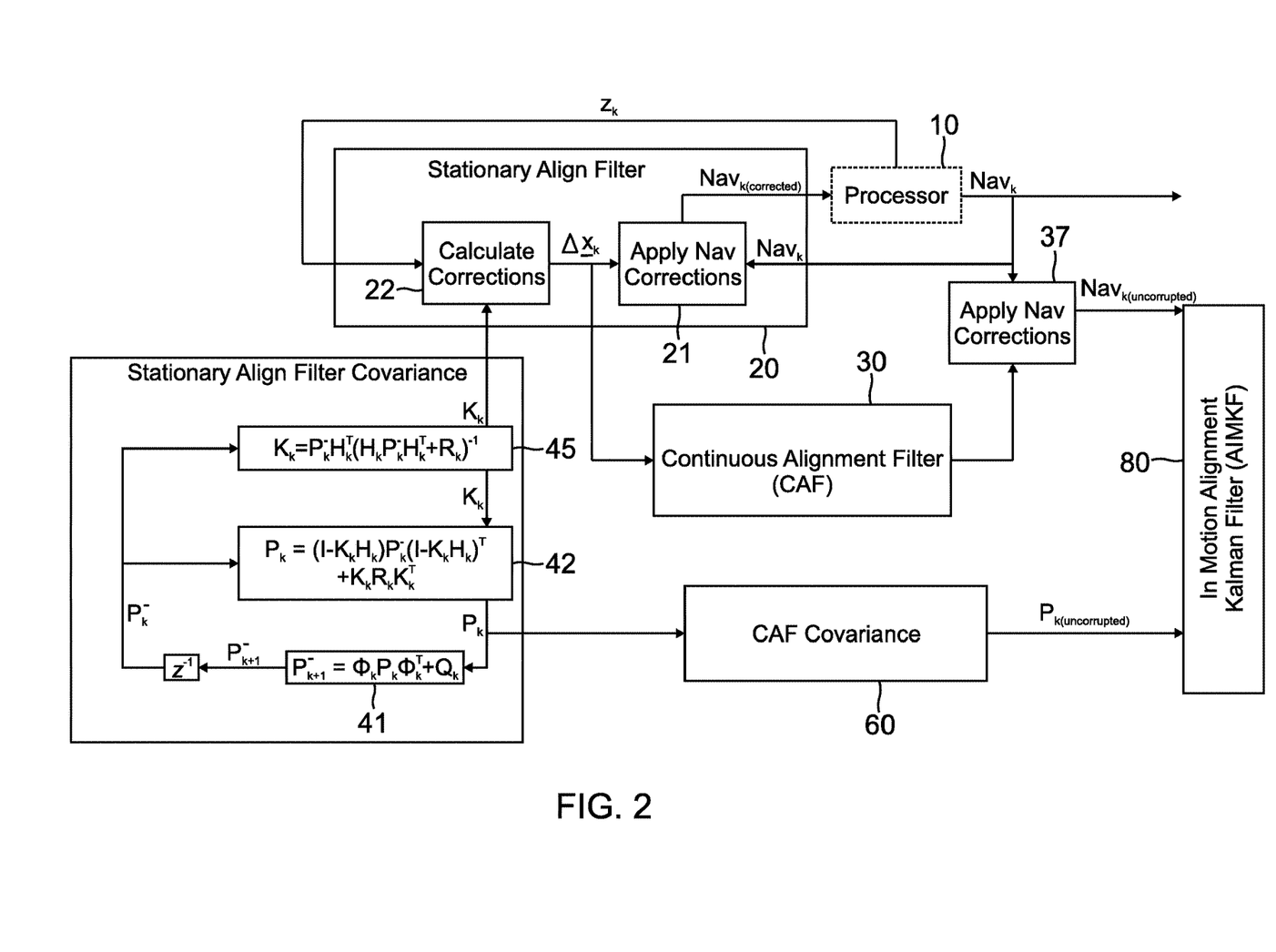
FIG. 2 is one embodiment of an exemplary stationary alignment Kalman filter which can be implemented in one embodiment of navigation system described in FIG. 1.

FIG. 2 is an exemplary block diagram of one embodiment of navigation system 100 of FIG. 1 depicting details of an example SAKF 20 and the SAKF covariance 40 representing the covariance of SAKF 20. As shown in FIG. 2, the SAKF 20 determines an expected value for the current state estimates. Corrections for the state estimates are predicted and calculated at time k based on the corrections that were applied in the previous time k−1. SAKF 20 updates the state estimate $\Delta \hat{x}_k$ for time k by calculating corrections using a corrector algorithm 22 as shown in FIG. 1. Corrector algorithm 22 uses the observation matrix $z_k$ and the Kalman gain $K_k$ calculated based on the covariance of SAKF 20 to calculate a corrected estimate at time k and update $\Delta \hat{x}_k$. Navigation corrections $\Delta \hat{x}_k$ are then applied by navigation corrections applicator 21 to predict the estimate $\Delta \hat{x}_{k+1}$ for the next time iteration k+1. Along with the value of $\Delta \hat{x}k$, this estimate is based on $Nav_k$ generated by processor 10 accounting for the estimates of previous iterations. The corrected estimates $Nav_{k(corrected)}$ is then utilized by processor 10 to update the observation matrix to be used in the following time iteration. The $Nav_k$ generated by processor 10 is also utilized by navigation corrections remover 37.

In some implementations, the filter states are reset every update so $\Delta \hat{x}_{k+1}$ as determined can be assumed to be zero. In such a case, $\Delta \hat{x}_k$ as updated by corrector 22 is only dependent on Kalman gain $K_k$ and observation matrix $z_k$. The updated $\Delta \hat{x}_k$ is received by a continuous alignment filter (CAF) 30 that provides an uncorrupted secondary solution which can be used by the in-motion alignment filter 80 once motion is detected. This uncorrupted secondary solution generated by the CAF 30 remains unaffected by the SAKF updates computed during a given time period.

The processing unit 150 is further configured to compute covariance for the state vector $\hat{x}$ k of SAKF 20, represented by SAKF covariance 40. The error covariance matrix $\tilde{P}_k$ is predicted by a covariance predictor algorithm 41. Covariance matrix $\tilde{P}_k$ for the next state is predicted based on the covariance computed for a previous state at k−1, the state transition model matrix $\Phi$ applied to the previous state, and the transpose of matrix $\Phi$ summed with a noise covariance Q. This $\tilde{P}_k$ is used to compute the Kalman gain $K_k$ and the error covariance matrix $\hat{P}_k$ for time k. In the example shown in FIG. 2, the Kalman gain $K_k$ is computed based on predicted error covariance $\tilde{P}_k$, transpose of observation matrix $H_k$, and the inverse of the observation matrix $H_k$, its transpose and predicted error covariance $\tilde{P}_k$ summed with the observed measurement vector covariance $R_k$ (See block 45). This computed Kalman gain $K_k$ is used to update the state estimate $x_k$ at time k and is also used to compute the covariance of $\hat{x}_k$, $\hat{P}_k$ at time k as shown in block 42. The error covariance matrix $\hat{P}_k$ is updated by corrector 42. $\hat{P}_k$ is predicted based on a previous covariance $\tilde{P}_k$, Kalman gain $K_k$, observation matrix $H_k$, and the measurement vector covariance matrix $R_k$. Once the error covariance matrix $\hat{P}_k$ has been computed, it is used to predict the covariance of the estimate at the next state at time k+1. As shown by predictor algorithm 41, the predicted covariance matrix $\tilde{P}_{k+1}$ is generated based on the state transition model matrix $\Phi_k$ applied to the previous state $\hat{P}_k$, the transpose of matrix $\Phi_k$ summed with a noise covariance $Q_k$.

Figure 3:
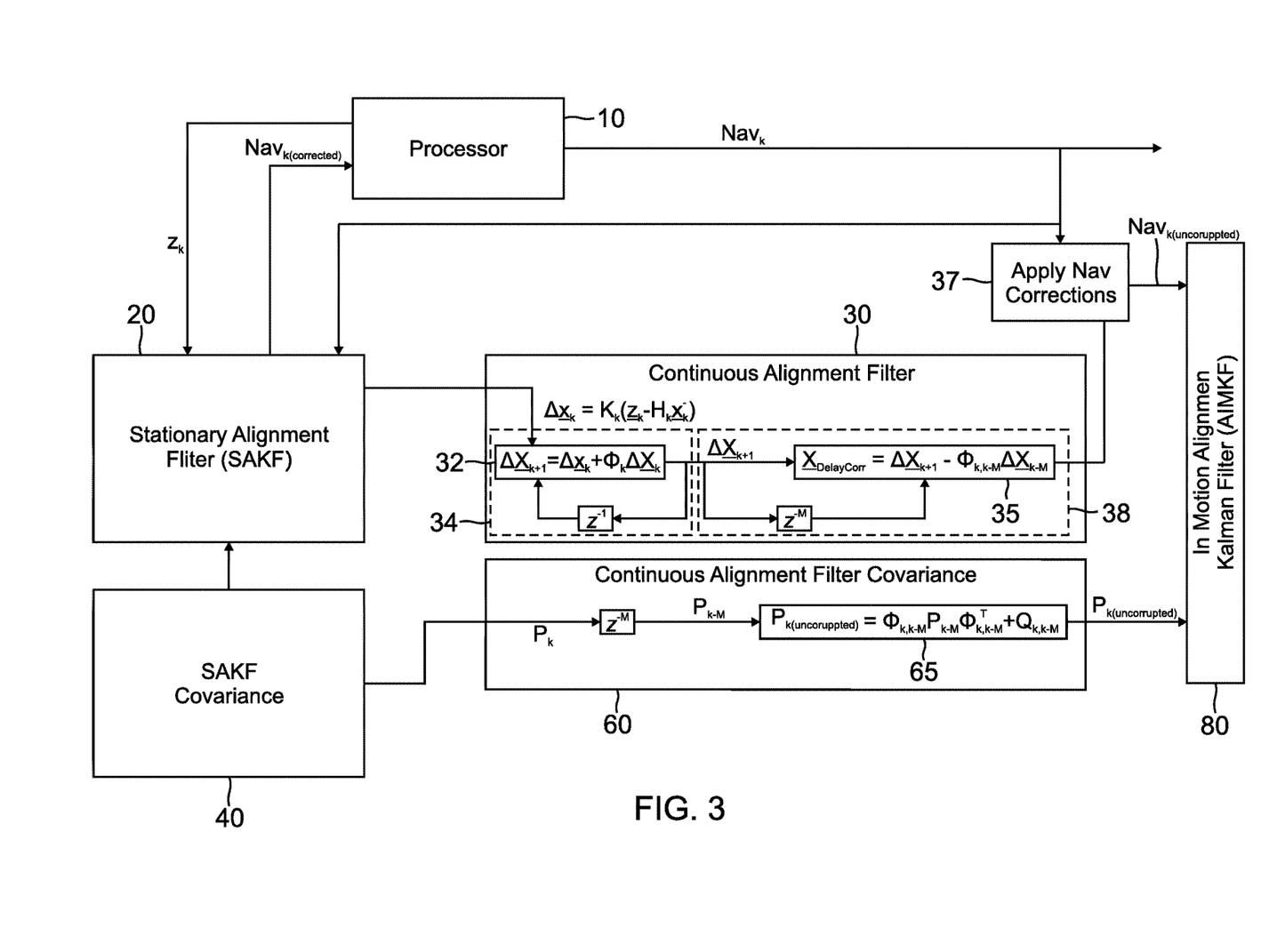
FIG. 3 is one embodiment of an exemplary continuous alignment filter which can be implemented in one embodiment of navigation system described in FIG. 1.

FIG. 3 is an exemplary block diagram of one embodiment of navigation system 100 of FIG. 1 depicting details of an example embodiment of continuous alignment filter (CAF) 30 and continuous alignment filter covariance 60, representing the covariance computed for CAF 30. Continuous alignment filter 30 provides a secondary solution that is unaffected by the stationary alignment filter corrections during the most recent given time period. In the implementation shown in FIG. 3, the continuous alignment filter removes a desired number of corrections so that the state estimate matrix used by the in-motion alignment is not corrupted by the estimates computed during the period from onset of actual motion of the vehicle to the time of motion detection.

As shown in FIG. 3, the state estimate $\Delta \hat{x}_k$ generated by the stationary alignment Kalman filter is used by the continuous alignment filter 30 to predict an estimated value of the accumulated correction vector $\Delta \tilde{X}_k$. The estimate $\Delta \tilde{X}_k$ for the secondary solution is predicted based on state transition model matrix $\Phi_{k,k-1}$ and accumulated correction at the previous state where $\Phi_{k,k-1}$ represents the state transition model matrix from time k−1 to time k. The propagated estimate for the current state is then added to $\Delta \hat{x}_k$ as computed by stationary alignment filter 20 to determine the updated estimate $\Delta \hat{X}_k$ for the continuous alignment filter 30 before motion is detected. (See block 32). An estimate $\hat{X}_{DelayCorr}$ is also computed by obtaining a difference between the state estimate $\Delta \hat{X}_{k+1}$ and the predicted state estimate $\Phi_{k,k-M} \Delta \hat{X}_{k-M}$ from delayed time k−M to time k. As shown in block 35, $\hat{X}_{k(DelayCorr)}$ represents the accumulated and propagated corrections obtained from time k−M to time k. To obtain an uncorrupted solution $Nav_{k(uncorrupted)}$ to be used by the in-motion alignment, the corrections from time k−M to time k are removed from the solution at the current state $Nav_k$ as generated in the stationary alignment filter. In one implementation, the corrections from time k−M may be removed using a navigation corrections remover algorithm 37.

CAF covariance 60 represents the covariance of the continuous alignment filter 30 as determined by the processing unit 150. Continuous alignment filter covariance accounts for the growth in uncertainty of the state errors from time k−M to time k. For example, if M is set to 10 seconds the algorithm computing the continuous alignment filter covariance will use the stationary alignment filter covariance $\hat{P}_k$ as computed at time k, propagate forward to what can be expected 10 seconds later. Similar to the predicted covariance in the stationary alignment mode, the expected uncorrupted covariance $\hat{P}_{k(uncorrupted)}$ is dependent on the covariance $P_{k-M}$, the state transition model matrix $\Phi_{k,k-M}$, and the transpose of the state transition model matrix $\Phi_{k,k-M}$ which is then added to the process noise matrix $Q_{k,k-M}$ (See block 65). The uncorrupted covariance $\hat{P}_{k(uncorrupted)}$ and the uncorrupted solution $Nav_{k(uncorrupted)}$ can be used by the in-motion alignment Kalman filter 80 to complete the alignment of the vehicle.

In some implementations, multiple CAFs can be implemented in parallel with each CAF having a different M value. Thus, in such an implementation, each CAF accounts for a different time delay. For example, CAF 30-1 removes the corrections from time k to M where the time delay k−M is 5 seconds and CAF 30-2 removes the corrections where time delay k−M is 10 seconds. Each CAF 30-n in such an implementation has a corresponding covariance 60-n that accounts for the respective time delays. In one implementation with multiple CAFs, each CAF calculates the value for $\Delta \hat{X}_{k+1}$ (block 34) and a value for $\hat{X}_{DelayCorr}$ corresponding to the time delay of the CAF (block 38). In another implementation with multiple CAFs, only one value for $\Delta \hat{X}_{k+1}$ is calculated which is shared by one or more CAFs in parallel but each CAF is responsible for calculating a value for $\hat{X}_{DelayCorr}$ corresponding to the time delay. In a multiple CAF implementation, $\hat{X}_{DelayCorr}$ for only one CAF is utilized by the navigation corrections remover algorithm 37 to obtain an uncorrupted solution $Nav_{k(uncorrupted)}$.

Figure 4:
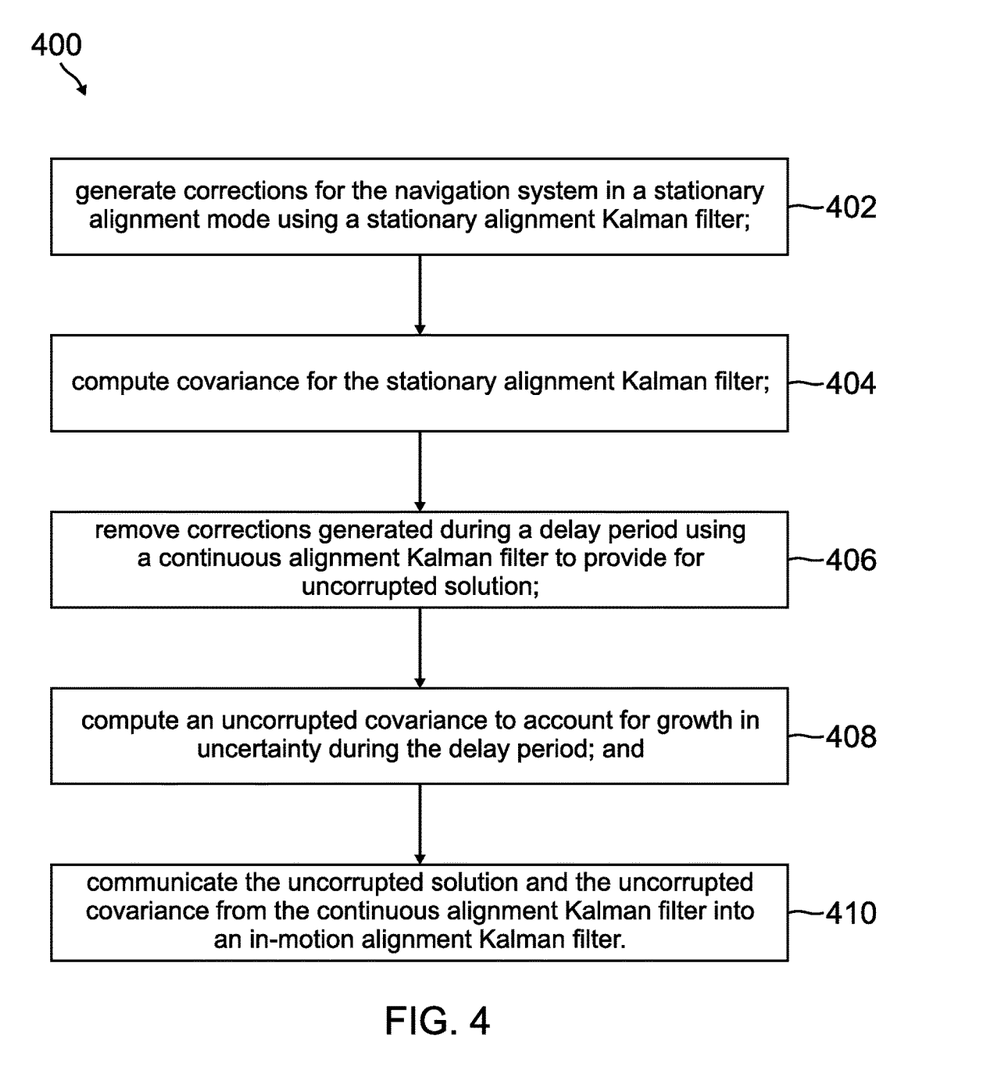
FIG. 4 is one embodiment of an exemplary method of transitioning from a stationary alignment mode to in-motion alignment mode.

FIG. 4 describes one embodiment of an exemplary method 400 for transitioning from a stationary alignment mode to in-motion alignment mode. At block 402, corrections for alignment of a navigation system on a vehicle are generated in a stationary alignment mode using a stationary alignment Kalman filter. Generating corrections in a stationary alignment mode includes predicting state estimates based on previous corrections and updating the state estimates based on previous corrections. At block 404, covariance for the stationary alignment Kalman filter is computed.

At block 406, corrections generated during a delay period are removed using a continuous alignment filter (CAF) to provide for an uncorrupted correction. In one implementation, the CAF is implemented with a time delay, and the corrections are removed by backing out a set of corrections generated within the time delay and determining the state estimates that were being processed before the time delay. In a further implementation, the time delay in the CAF is set to 5 seconds or 10 seconds. In some implementations, this time delay is determined based on a predetermined delay period. In a further implementation, this delay period can be predetermined based on the amount of time taken by the vehicle's navigation system to detect motion. At block 408, an uncorrupted covariance to account for growth of uncertainty during the delay period is computed. The uncorrupted covariance is computed by using the SAKF covariance values prior to the delay and propagating forward to the quality that can be expected after the delay. This propagated value is the uncorrupted covariance that is used by an in-motion alignment Kalman filter to complete the alignment.

At block 410, the uncorrupted solution and the uncorrupted covariance is communicated to an in-motion alignment Kalman filter. In one implementation, method 400 also accounts for variables considered for corrections in the stationary alignment mode and set of variables considered for corrections in the in-motion alignment mode. In some implementations, set of variables considered for corrections in the stationary alignment mode include one or more of roll and pitch of the vehicle, earth's rotation rates and velocity errors. In a further implementation, the variables considered in the stationary alignment mode also includes tilt errors. In some implementations, the set of variables considered by the in-motion alignment filter includes any or all of heading, attitude, velocity and position states.

Example Embodiments

Example 1 includes a navigation system comprising: a processing unit, wherein the processing unit is configured to implement a stationary alignment Kalman filter (SAKF) to generate state estimates and provide corrections when the object is stationary, and wherein the processing unit is further configured to implement an algorithm to compute a covariance for the SAKF that accounts for uncertainty in the SAKF estimates; wherein the processing unit is further configured to implement a continuous alignment filter (CAF) that generates a secondary solution which remains unaffected by the SAKF corrections during a delay period from a time of actual motion to a time of detected motion, and wherein the processing unit is further configured to implement an algorithm to compute a covariance for CAF that accounts for the uncertainty in CAF during the delay period; and wherein outputs of the CAF and its covariance are communicated to an in-motion alignment filter.

Example 2 includes the navigation system of Example 1, wherein the CAF removes the corrections generated by the SAKF during the delay period to provide state estimates as generated before the delay period.

Example 3 includes the navigation system of any of Examples 1-2, wherein duration of the delay period is predetermined.

Example 4 includes the navigation system of any of Examples 1-3, wherein the processing unit is further configured to implement: one or more additional CAFs implemented in parallel with the at least one CAF wherein the duration of the delay period in each CAF is different; an algorithm to compute a covariance for each of the implemented CAFs that accounts for the uncertainty in the respective CAF during the respective delay period; and wherein the solution generated by only one of CAFs is applied to remove corrections for the delay period and communicated to the in-motion alignment filter.

Example 5 includes the navigation system of Example 4, wherein accumulated correction value of state estimates computed for each time iteration is shared by the CAFs implemented in the processing unit.

Example 6 includes the navigation system of any of Examples 1-5, further comprising a processor that resets the state to zero and feeds the state back into the SAKF to generate a new state estimate.

Example 7 includes the navigation system of any of Examples 1-6, wherein a first set of variables used by the processing unit in computing corrections in the stationary alignment mode is different from a second set of variables considered by the system for corrections in the in-motion alignment mode, and wherein the CAF covariance accounts for the difference between the first set of variables and the second set of variables.

Example 8 includes the navigation system of any of Examples 6-7, wherein the first set of variables considered in the stationary alignment mode include one or more of earth's rotation rates, and tilt errors, and velocity errors.

Example 9 includes the navigation system of any of Examples 6-8, wherein the second set of variables considered in the in-motion alignment mode includes any or all of heading, attitude, velocity and position of the vehicle.

Example 10 includes the navigation system of any of Examples 1-9, wherein sensor bias state is included in first set of variables and the second set of variables.

Example 11 includes a navigation method to transition from stationary alignment to in-motion alignment, the method comprising: generating state estimates and providing corrections for the state estimates in a stationary alignment mode using a stationary alignment Kalman filter; computing covariance for the stationary alignment Kalman filter; removing corrections generated during a delay period using a first continuous alignment filter to provide for an uncorrupted solution; computing an uncorrupted covariance to account for growth in uncertainty during the delay period; and communicating the uncorrupted solution and the uncorrupted covariance from the continuous alignment filter into an in-motion alignment Kalman filter.

Example 12 includes the navigation method of Example 11, wherein removing the corrections during a delay period further comprises: implementing the continuous alignment filter with a time delay; backing out a set of corrections corresponding to the time delay; and determining the state estimates that were being processed before the time delay.

Example 13 includes the navigation method of any of Examples 11-12 further comprising setting the time delay based on a predetermined delay period.

Example 14 includes the navigation method of any of Examples 11-13 further comprising: sending the state estimates into an inertial navigation processor and/or an inertial sensor to reset the state to zero; and feeding the states back into the SAKF to generate a new state estimate.

Example 15 includes the navigation method of any of Examples 11-14, further comprising accounting for a difference in a set of variables considered for corrections in the stationary alignment mode and a set of variables considered for corrections in the in-motion alignment mode.

Example 16 includes the navigation method of Example 15, wherein the set of variables considered for corrections in the stationary alignment mode include one or more of earth's rotation rates, tilt errors, and velocity errors.

Example 17 includes the navigation method of any of Examples 15-16, wherein the set of variables considered by the in-motion alignment filter includes any or all of heading, attitude, velocity and position states.

Example 18 includes the navigation method of any of Examples 11-17 further comprises: implementing a second CAF in parallel with the first CAF, each CAF accounting for a different time delay; computing an uncorrupted covariance for each CAF in the navigation system; and applying navigation corrections for only one of the first and second CAF to provide for an uncorrupted solution.

Example 19 includes a program product comprising a processor-readable medium on which program instructions are embodied, wherein the program instructions are configured, when executed by at least one programmable processor, to cause the at least one programmable processor to: generate state estimates when a vehicle is stationary using a stationary alignment Kalman filter (SAKF); measure the uncertainty of the state estimates while the vehicle is stationary; remove corrections generated by the SAKF during a time delay to calculate an uncorrupted state estimate, the time delay comprising a time between actual motion of the vehicle to a time of motion detected by a navigation system; determine a continuous alignment filter covariance that accounts for growth in uncertainty of state estimates during the time delay, and outputs an uncorrupted uncertainty based on the uncertainty of the state estimate prior to the time delay; and an in-motion alignment filter that resumes the estimation of the states once the uncorrupted state estimate has been communicated; and an in-motion alignment filter covariance that utilizes the uncorrupted uncertainty in estimation of the state estimates while the vehicle is moving.

Example 20 includes the program product of Example 19, wherein the program instructions are further configured to cause the at least one programmable processor to reset state estimates from the SAKF to zero and feed the reset state estimates back into the SAKF to generate a new state estimate. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A navigation system for a vehicle, the navigation system comprising:
    a processing unit, wherein the processing unit is configured to implement a stationary alignment Kalman filter (SAKF) in a gyrocompass alignment mode to generate state estimates and provide corrections when the vehicle is stationary, and wherein the processing unit is further configured to implement an algorithm to compute a covariance for the SAKF that accounts for uncertainty in the SAKF estimates;
    wherein the processing unit is further configured to implement a continuous alignment filter (CAF) that generates a secondary solution which remains unaffected by the SAKF corrections during a delay period from a time of actual motion of the vehicle to a time of detected motion, and wherein the processing unit is further configured to implement an algorithm to compute a covariance for CAF that accounts for the uncertainty in CAF during the delay period; and
    wherein outputs of the CAF and its covariance are communicated to an in-motion alignment filter,
    an inertial sensor coupled to the processing unit, wherein vehicle motion is detected using measurements from the inertial sensor, and wherein in response to detected vehicle motion the processing unit implements the in-motion alignment filter and begins processing the output from the CAF using the in-motion alignment filter to generate an output from the processing unit providing navigation estimates for the vehicle when the vehicle is moving.

2. The navigation system of claim 1, wherein the CAF removes the corrections generated by the SAKF during the delay period to provide state estimates as generated before the delay period.

3. The navigation system of claim 1, wherein duration of the delay period is predetermined.

4. The navigation system of claim 1, wherein the processing unit is further configured to implement:
    one or more additional CAFs implemented in parallel with the at least one CAF wherein the duration of the delay period in each CAF is different;
    an algorithm to compute a covariance for each of the implemented CAFs that accounts for the uncertainty in the respective CAF during the respective delay period; and
    wherein the solution generated by only one of CAFs is applied to remove corrections for the delay period and communicated to the in-motion alignment filter.

5. The navigation system of claim 4, wherein accumulated correction value of state estimates computed for each time iteration is shared by the CAFs implemented in the processing unit.

6. The navigation system of claim 1, further comprising a processor that resets the state to zero and feeds the state back into the SAKF to generate a new state estimate.

7. The navigation system of claim 1, wherein a first set of variables used by the processing unit in computing corrections in the gyrocompass alignment mode is different from a second set of variables considered by the system for corrections in the in-motion alignment mode, and wherein the CAF covariance accounts for the difference between the first set of variables and the second set of variables.

8. The navigation system of claim 6, wherein a first set of variables considered in the gyrocompass alignment mode include one or more of earth's rotation rates, and tilt errors, and velocity errors.

9. The navigation system of claim 6, wherein a second set of variables considered in the in-motion alignment mode includes any or all of heading, attitude, velocity and position of the vehicle.

10. The navigation system of claim 1, wherein sensor bias state is included in a first set of variables and a second set of variables.

11. A navigation method to transition from gyrcompass alignment to in-motion alignment, the method comprising:
    generating state estimates and providing corrections for the state estimates in a gyrocompass alignment mode using a stationary alignment Kalman filter when a vehicle is stationary;
    computing covariance for the stationary alignment Kalman filter;
    removing corrections generated during a delay period using a first continuous alignment filter to provide for an uncorrupted solution;
    computing an uncorrupted covariance to account for growth in uncertainty during the delay period;
    communicating the uncorrupted solution and the uncorrupted covariance from the continuous alignment filter into an in-motion alignment Kalman filter; and
    detecting vehicle motion using measurements from an inertial sensor;
    wherein in response to detected vehicle motion, processing the output from the CAF using the in-motion alignment filter; and
    generating an output from the processing unit to provide navigation estimates for the vehicle when the vehicle is moving.

12. The navigation method of claim 11, wherein removing the corrections during a delay period further comprises:
    implementing the continuous alignment filter with a time delay;
    backing out a set of corrections corresponding to the time delay; and
    determining the state estimates that were being processed before the time delay.

13. The navigation method of claim 11 further comprising setting the time delay based on a predetermined delay period.

14. The navigation method of claim 11 further comprising:
    sending the state estimates into an inertial navigation processor and/or an inertial sensor to reset the state to zero; and
    feeding the states back into the SAKF to generate a new state estimate.

15. The navigation method of claim 11, further comprising accounting for a difference in a set of variables considered for corrections in the gyrocompass alignment mode and a set of variables considered for corrections in the in-motion alignment mode.

16. The navigation method of claim 15, wherein the set of variables considered for corrections in the gyrocompass alignment mode include one or more of earth's rotation rates, tilt errors, and velocity errors.

17. The navigation method of claim 15, wherein the set of variables considered by the in-motion alignment filter includes any or all of heading, attitude, velocity and position states.

18. The navigation method of claim 11 further comprises:
implementing additional CAFs in parallel with the first CAF, each CAF accounting for a different time delay;
computing an uncorrupted covariance for each CAF in the navigation system; and
applying navigation corrections for only one of the CAFs to provide for an uncorrupted solution.

19. A program product comprising a non-transitory processor-readable medium on which program instructions are embodied, wherein the program instructions are configured, when executed by at least one programmable processor, to cause the at least one programmable processor to:
generate state estimates when a vehicle is stationary using a stationary alignment Kalman filter (SAKF);
measure the uncertainty of the state estimates while the vehicle is stationary;
remove corrections generated by the SAKF during a time delay to calculate an uncorrupted state estimate, the time delay comprising a time between actual motion of the vehicle to a time of motion detected by a navigation system;
determine a continuous alignment filter covariance that accounts for growth in uncertainty of state estimates during the time delay, and outputs an uncorrupted uncertainty based on the uncertainty of the state estimate prior to the time delay;
implement an in-motion alignment filter that resumes the estimation of the states once the uncorrupted state estimate has been communicated;
implement an in-motion alignment filter covariance that utilizes the uncorrupted uncertainty in estimation of the state estimates while the vehicle is moving; and
in response to detected vehicle motion, begin processing the output from the CAF using the in-motion alignment filter and generate an output from the processing unit providing navigation estimates for the vehicle when the vehicle is moving, wherein the vehicle motion is detected using measurements from an inertial sensor.

20. The program product of claim 19, wherein the program instructions are further configured to cause the at least one programmable processor to reset state estimates from the SAKF to zero and feed the reset state estimates back into the SAKF to generate a new state estimate.

* * * * *